United States Patent
Tung et al.

(10) Patent No.: US 10,368,252 B1
(45) Date of Patent: Jul. 30, 2019

(54) ELECTRONIC DEVICE FOR CONTROLLING INTELLIGENT ANTENNA MODULE AND METHOD FOR CARRYING OUT INTELLIGENT FAST ANTENNA STEERING TECHNOLOGY (IFAST)

(71) Applicant: CUMITEK INC., Hsinchu County (TW)

(72) Inventors: Ming-Ta Tung, Hsinchu County (TW); Chia-Hsin Liao, Hsinchu County (TW)

(73) Assignee: CUMITEK INC. (TW)

( * ) Notice: Subject to any disclaimer, the term of this patent is extended or adjusted under 35 U.S.C. 154(b) by 0 days.

(21) Appl. No.: 15/884,270

(22) Filed: Jan. 30, 2018

(51) Int. Cl.
*H04W 16/28* (2009.01)
*H04W 24/02* (2009.01)
*H04W 52/02* (2009.01)

(52) U.S. Cl.
CPC .......... *H04W 16/28* (2013.01); *H04W 24/02* (2013.01); *H04W 52/0206* (2013.01)

(58) Field of Classification Search
CPC .. H04W 16/28; H04W 24/02; H04W 52/0206
USPC ........................................................ 370/311
See application file for complete search history.

(56) References Cited

U.S. PATENT DOCUMENTS

| | | | | |
|---|---|---|---|---|
| 9,680,548 B1* | 6/2017 | Tung | .................... | H04B 7/0617 |
| 2003/0064753 A1* | 4/2003 | Kasapi | ................. | H04B 7/0617 |
| | | | | 455/561 |
| 2005/0181740 A1* | 8/2005 | Kwak | ................. | H04W 52/226 |
| | | | | 455/69 |
| 2015/0351104 A1* | 12/2015 | Sagae | ................. | H04W 72/082 |
| | | | | 370/329 |
| 2016/0095130 A1* | 3/2016 | Ho | ........................ | G06F 16/901 |
| | | | | 370/329 |
| 2016/0323755 A1* | 11/2016 | Cordeiro | ............. | H04J 13/0014 |

* cited by examiner

*Primary Examiner* — Stephen J Clawson

(57) ABSTRACT

The present invention mainly discloses an electronic device for controlling intelligent antenna module based on intelligent fast antenna steering technology (iFAST), wherein the electronic device is applied in wireless network transceiving device. Particularly, according to the wireless network parameters of wireless signals received by a wireless network transceiving device from wireless stations established connections with the wireless network transceiving device, an iFAST unit in the electronic device would immediately update relative MAC station entry tables in a MAC module, such that the baseband processor module would correspondingly adjust the settings of the intelligent antenna module of the wireless network transceiving device based on relative wireless station entry records been established in the MAC station entry tables contained by the MAC module. As a result, the wireless network transceiving device is ensured to radiate customized wireless network signals to cover the targeted wireless stations.

4 Claims, 8 Drawing Sheets

(a)
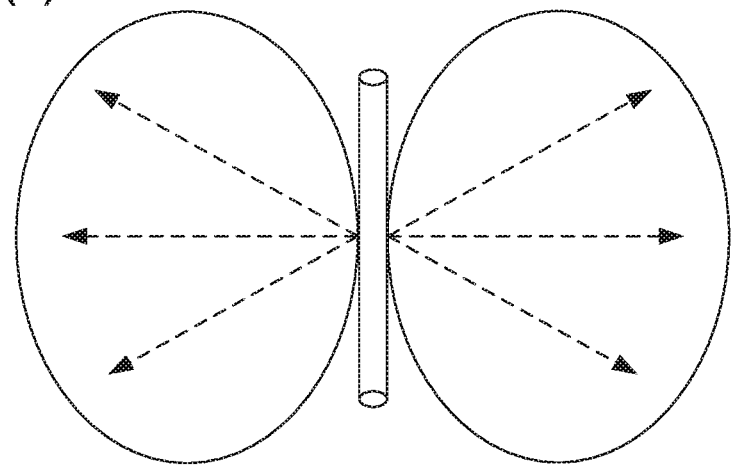
(b)
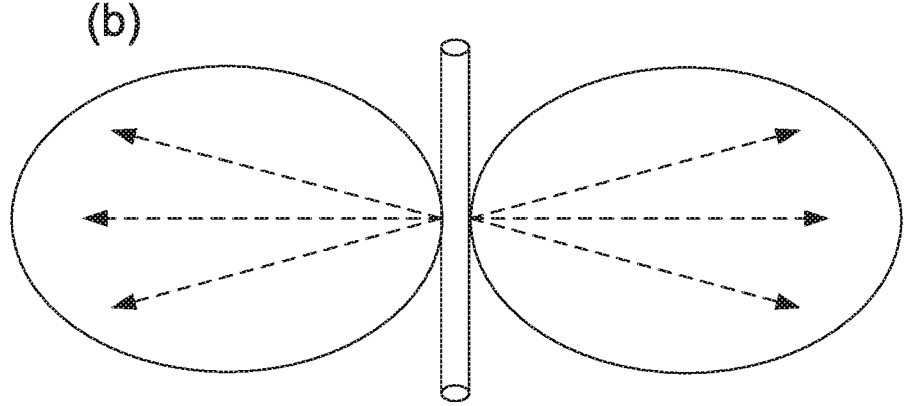
FIG. 1
(Prior art)

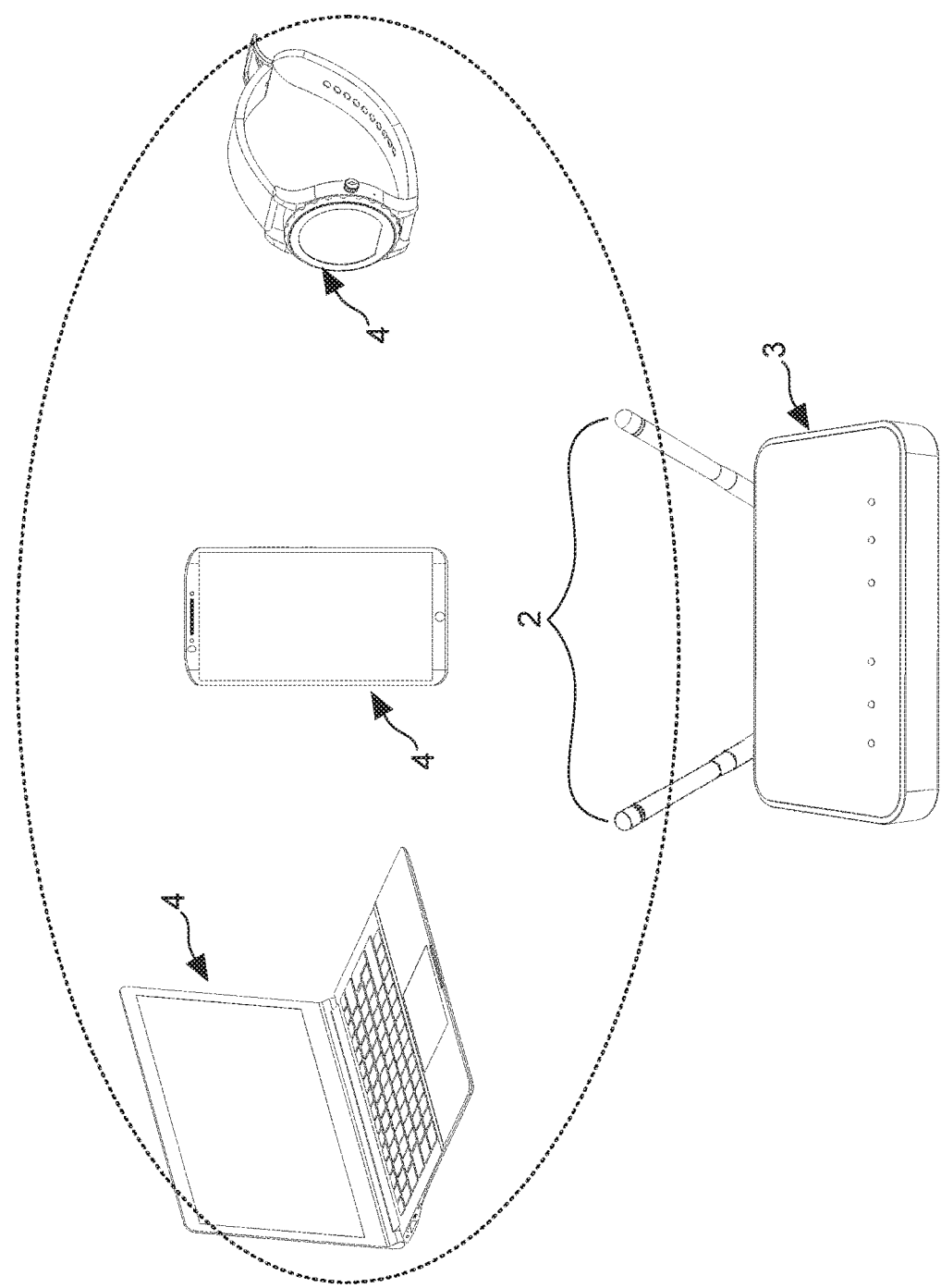

ELECTRONIC DEVICE FOR CONTROLLING INTELLIGENT ANTENNA MODULE AND METHOD FOR CARRYING OUT INTELLIGENT FAST ANTENNA STEERING TECHNOLOGY (IFAST)

BACKGROUND OF THE INVENTION

1. Field of the Invention

The present invention relates to the field of WiFi technologies, and more particularly to an electronic device for controlling an intelligent antenna module and a method for carrying out an intelligent fast antenna steering technology (iFAST).

2. Description of the Prior Art

With the popularity of notebooks, tablet PCs and smart phones, there is a need for people to have an available wireless network service anytime and anywhere. Therefore, how to provide a high-quality wireless network service with a high coverage rate has been regarded as an important construction project in various countries. For instance, New York City has turned 170 smart garbage bins into free WiFi hotspots for providing public and free wireless network service to city residents with 50-75 MB bandwidth.

FIG. 1 shows a schematic operation diagram of the omni-directional antenna. It is well known that, commercial WiFi APs or routers are conventionally equipped with at least one omni-directional antenna, which is one kind of dipole antenna. From diagram (a) of FIG. 1, it is understood that the omni-directional antenna radiates equal power in all azimuthal directions perpendicular to its axis. Moreover, as diagram (b) of FIG. 1 shows, the transmission distance of the horizontal radiation waves of the omni-directional antenna is extended after compressing the vertical radiation waves. As a result, the radiation waves radiated by the omni-directional antenna are concentrated to cover a specific region or position.

Because that the WiFi APs or routers equipped with the omni-directional antennas are usually disposed in an application environment such as working environment (office), residence environment or public place, there must be some dead corners existing in the application environment fail to be well covered by the wireless signals radiated from the WiFi APs or routers. When one WiFi AP is disposed in an office, for example, it is found that the wireless signals of the WiFi AP cannot comprehensively cover all of the rooms arranged in the office due to influences induced from noise signals or signal blocking caused by those room walls. As a result, the rooms unable to receive high-strength wireless signals hence become dead corners for the transmission of the wireless signals.

From improving the drawbacks in the use of the WiFi AP having omni-directional antennas, U.S. patent publication No. 2011/0254748 A1 discloses an antenna for steering antenna beam direction. With reference to FIG. 2, there is provided a stereo diagram of the antenna for steering antenna beam direction disclosed by U.S. patent publication No. 20110254748 A1. The antenna 50' comprises: a ground plane 56', a main IMD element 51', at least one parasitic element 52', and at least one active element 53', wherein the main IMD element 51', the parasitic element 52' and the active element 53' are disposed on the ground plane 56'. On the other hand, it is known that the said active element 53' is a switch, a MOSFET or a voltage controlled tunable capacitor from the disclosures of the U.S. patent. Therefore, by using the active element 53' to switch the parasitic element 52' to be a short-circuit state or an open-circuit state, the direction of the antenna beam is steerable.

In addition, U.S. patent publication No. 20130120200 A1 discloses a Multi leveled active antenna configuration for multiband mimo LTE system. FIG. 3 illustrates a circuit block diagram of a two-antenna system comprising two active modal antennas. From FIG. 3, it is understood that the two antenna system 2' is applied in a wireless access point (AP), and comprises: a baseband processor 24', two transceivers (TXCR) 26', two active filters 28', and two antennas 50', wherein the antenna 50' is disclosed by U.S. patent publication No. 20110254748 A1. When the two antenna system 2' works normally, the baseband processor 24' is configured for comparing wireless parameters such as RSSI and BER with those optimized wireless parameters pre-stored, so as to subsequently vary the wireless parameters and dynamically controlling antenna modes for enhanced performance of the two antennas 50'.

It is worth noting that, the way of "comparing wireless parameters with the pre-stored optimized wireless parameters so as to vary the wireless parameters" is found fail to make the wireless signals of the WiFi AP comprehensively cover all of wireless stations in an application environment. Moreover, such way would also lead the WiFi AP to consume considerable power. From above descriptions, it is understood that how to design or develop an electronic device or a method for effectively make the WiFi AP able to comprehensively cover all of wireless stations in an application environment has now become an important issue. In view of the, inventors of the present application have made great efforts to make inventive research thereon and eventually provided an electronic device for controlling an intelligent antenna module and a method for carrying out an intelligent fast antenna steering technology (iFAST).

SUMMARY OF THE INVENTION

The primary objective of the present invention is to provide an electronic device for controlling an intelligent antenna module and a method for carrying out an intelligent fast antenna steering technology (iFAST), wherein the electronic device comprises: a memory module, a media access controlling (MAC) module, and a baseband processor. In the present invention, the memory module is provided with a WiFi driver unit, an intelligent fast antenna steering (iFAST) unit, and an application interface (API) unit. Particularly, according to the wireless network parameters of wireless signals received by a wireless network transceiving device from wireless stations established connections with the wireless network transceiving device, the iFAST unit would immediately update relative MAC station entry tables in the MAC module. Therefore, the baseband is facilitated to correspondingly adjust the settings of the intelligent antenna module of the wireless network transceiving device based on relative wireless station entry records been established in the MAC station entry tables contained by the MAC module. As a result, the wireless network transceiving device is ensured to radiate customized wireless network signals to cover the targeted wireless stations.

In order to achieve the primary objective of the present invention, the inventor of the present invention provides an embodiment of the electronic device, which is applied in a wireless network transceiving device for controlling an intelligent antenna module comprising a plurality of antenna units, a plurality of signal inputting electrodes and a plurality of control electrodes; wherein the electronic device comprises:
a memory module, provided with an intelligent fast antenna steering (iFAST) unit, an application interface (API) unit, and a WiFi driver unit therein, wherein the API unit communicates between the iFAST unit and the WiFi driver unit;
a media access controlling (MAC) module, coupled to the memory module;
a baseband processor, coupled to the MAC module and electrically connected to the plurality of signal inputting electrodes and the plurality of control electrodes; and
at least one transceiver module, electrically connected between the baseband processor and the intelligent antenna module;
wherein the iFAST unit activates the MAC module and the baseband processor to control the intelligent antenna module achieve a comprehensively-directional antenna scan through the API unit and the WiFi driver unit, so as to make the wireless network transceiving device receive wireless signals transmitted from wireless stations established connections with thereof; therefore, the iFAST unit calculates corresponding best wireless network weights;
wherein the iFAST unit creates at least one wireless station entry record, based on the calculated best wireless network weights and wireless network parameters of the received wireless signals, in at least one MAC station entry table contained by the MAC module;
wherein the baseband processor is facilitated to change settings of the intelligent antenna module by outputting a control signal to the control electrodes after accessing the wireless station entry record of the MAC station entry table, and the then transceiver module converts a baseband signal generated by the baseband processor to an RF signal; therefore, after receiving the RF signal through the signal inputting electrodes, the intelligent antenna module radiates at least one wireless network signal to cover the targeted wireless stations established connections with the wireless network transceiving device.

Moreover, for achieving the primary objective of the present invention, the inventor of the present invention also provides an embodiment of the method for carrying out an intelligent fast antenna steering technology (iFAST) in a wireless network transceiving device, wherein the method is implemented into a wireless network transceiving device by a form of an electronic chip comprising a memory module, a media access controlling (MAC) module, a baseband processor, and at least one transceiver module; moreover, the wireless network transceiving device has an intelligent antenna module comprising a plurality of antenna units, a plurality of signal inputting electrodes and a plurality of control electrodes. The (1) providing an intelligent fast antenna steering (iFAST) unit, an application interface (API) unit, and a WiFi driver unit in the memory module, and enabling the iFAST unit;
(2) determining whether a specific timer event is triggered for driving the intelligent antenna module to start a comprehensively-directional antenna scan; if yes, proceeding to step (3); otherwise, proceeding back to the step (2);
(3) determining whether each of wireless station entry records in at least one MAC station entry table contained by the MAC module has been accessed; if yes, proceeding to step (4); otherwise, proceeding back to the step (2);
(4) accessing the wireless station entry records never been accessed so as to correspondingly establish a plurality of antenna direction data structures (antDir) after the intelligent antenna module 2 completed the comprehensive directional antenna scan;
(5) determining whether there are any antenna setting entry records in the antenna direction data structures never been accessed; if yes, proceeding to step (6); otherwise, proceeding to step (9);
(6) the baseband processor varying settings of the intelligent antenna module according to a plurality of antenna settings described in the antenna setting entry records, so as to make the iFAST unit subsequently access multi wireless network parameters of wireless signals received by the wireless network transceiving device from corresponding wireless stations;
(7) after a certain period of time passes, the iFAST unit accessing the wireless network parameters of the wireless signals again, and then storing the wireless network parameters into the corresponding antenna direction data structures;
(8) the iFSAT unit calculating a plurality of wireless network weights based on the wireless network parameters, and then updating the corresponding wireless network weights into the relative antenna setting entry records of the antenna direction data structures; subsequently, proceeding back to the step (5); and
(9) selecting a best wireless network weight from the plurality of wireless network weights in the antenna setting entry records of the antenna direction data structure, wherein the antenna direction data structure is corresponding to one specific wireless station entry record for describing one specific wireless station; and then, the iFAST unit updating the wireless network parameters stored in the antenna setting entry record having the best wireless network weight into the wireless station entry record; subsequently, proceeding back to the step (3).

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 1 shows a schematic operation diagram of an omni-directional antenna;

FIG. 5 shows a stereo diagram for depicting relationship between the intelligent antenna module, a wireless network transceiving device, and several wireless stations.

DETAILED DESCRIPTION OF THE PREFERRED EMBODIMENTS

To more clearly describe an electronic device for controlling an intelligent antenna module and a method for carrying out an intelligent fast antenna steering technology (iFAST)

disclosed by the present invention, embodiments of the present invention will be described in detail with reference to the attached drawings hereinafter.

Figure 2:
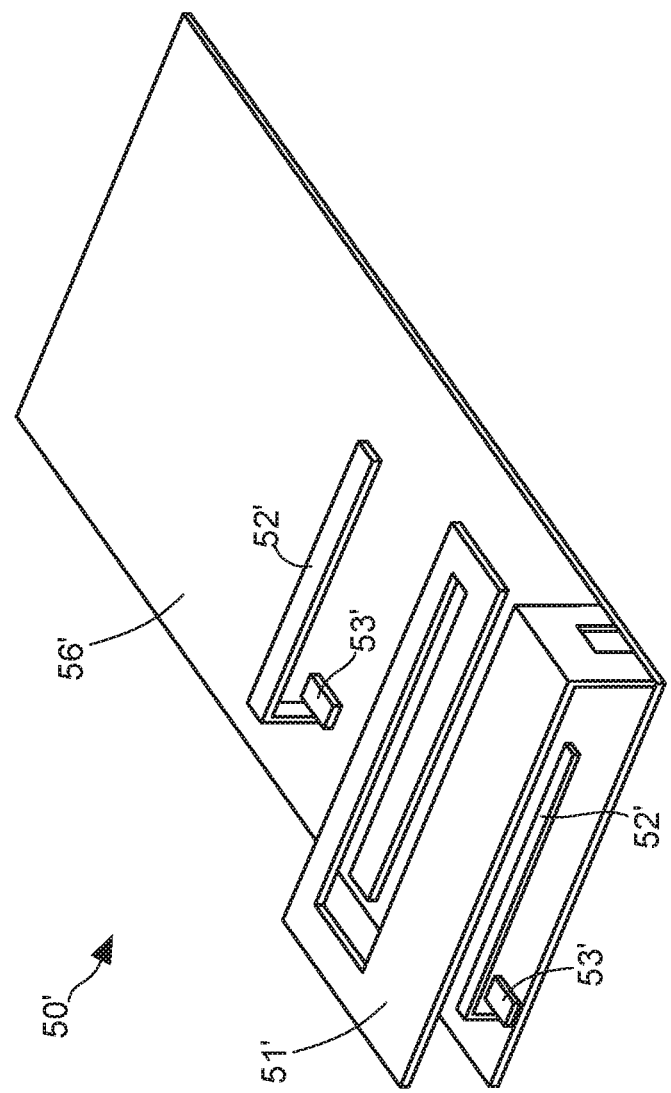
FIG. 2 shows a stereo diagram of an antenna for steering antenna beam direction disclosed by U.S. patent publication No. 20110254748 A1.
Figure 3:
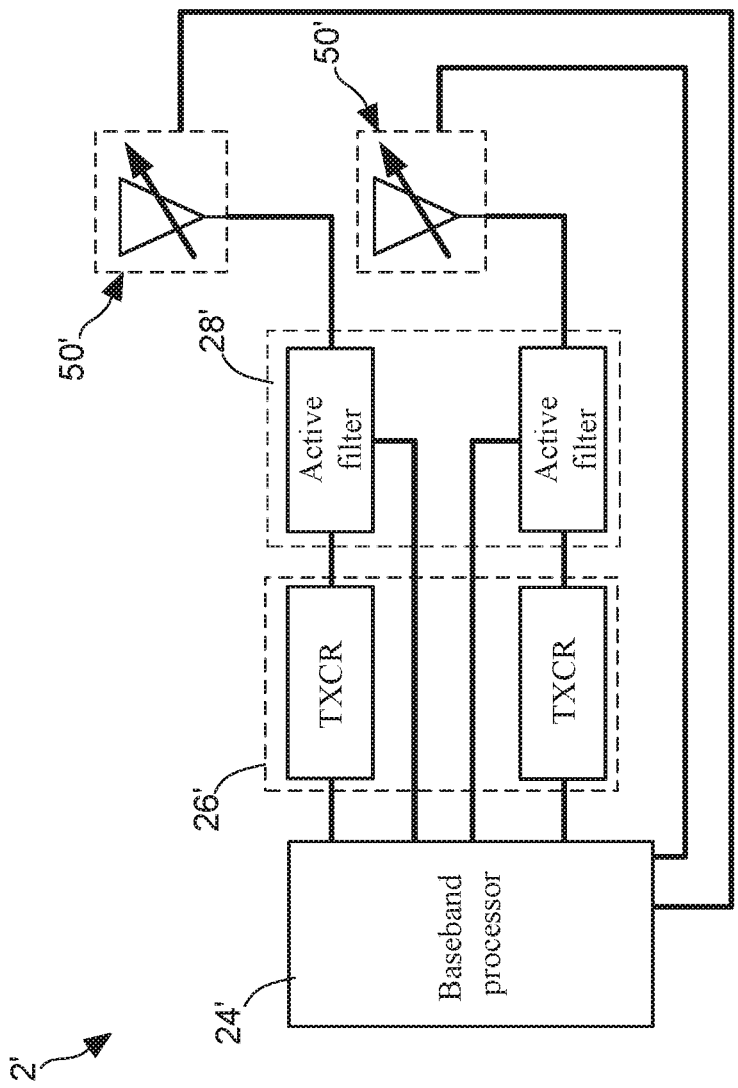
FIG. 3 shows a circuit block diagram of a two-antenna system comprising two active modal antennas.
Figure 4:
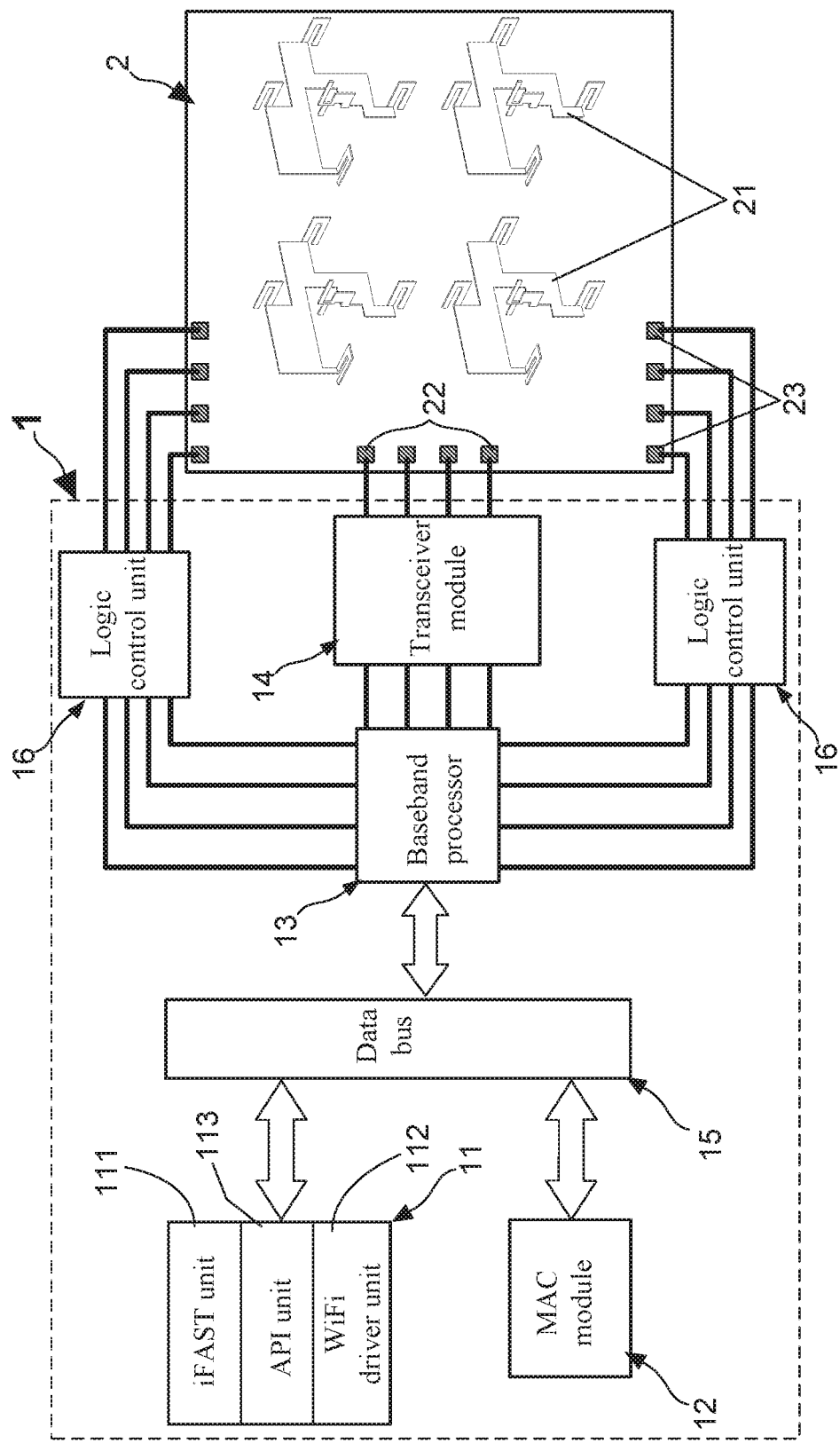
FIG. 4 shows a circuit block diagram of an electronic device for controlling an intelligent antenna module according to the present invention.

With reference to FIG. 4, there is provided a circuit block diagram of an electronic device for controlling an intelligent antenna module according to the present invention. Moreover, FIG. 5 shows a stereo diagram for depicting relationship between the intelligent antenna module, a wireless network transceiving device, and several wireless stations. From FIG. 4 and FIG. 5, it is understood that the electronic device 1 of the present invention is applied in the wireless network transceiving device 3 for controlling the intelligent antenna module 2, wherein the intelligent antenna module 2 comprises: a plurality of antenna units 21, a plurality of signal inputting electrodes 22 and a plurality of control electrodes 23. Although FIG. 5 depicts that the wireless network transceiving device 3 is a wireless network access point (AP), it is not a limitation made for the wireless network transceiving device 3 on its application type. In practical use, the wireless network transceiving device 3 can also be a wireless network router, a wireless network repeater, or a wireless network card. According to the particular design of the present invention, the electronic device 1 comprises: a memory module 11, a media access controlling (MAC) module 12, a baseband processor 13, at least one transceiver module 14, a data bus 15, and at least one logic control unit 16, wherein the data bus 15 is a communication bridge between the memory module 12, the MAC module 12 and the baseband module 13. It is worth mentioning that, the MAC module 12 and the memory module 11 are integrated to an integrated circuit (IC) chip. In addition, it can also integrate the baseband processor 13, the MAC module 12 and the memory module 11 to one signal integrated circuit (IC) chip.

The memory module 11 is provided with an intelligent fast antenna steering (iFAST) unit 111, an application interface (API) unit 113, and a WiFi driver unit 112 therein, wherein the API unit 113 communicates between the iFAST unit 111 and the WiFi driver unit 112. It needs to explain that the said iFAST unit 111 is implemented into the memory module 11 by a library form of an intelligent fast antenna steering technology. On the other hand, the MAC module 12 is coupled to the memory module 11, and the baseband processor 13 is coupled to the MAC module 12 and electrically connected to the signal inputting electrodes 23 and the control electrodes 22 of the intelligent antenna module 2. Moreover, the transceiver module 14 is electrically connected between the baseband processor 13 and the intelligent antenna module 2.

Herein it needs to emphasize that, the said intelligent fast antenna steering technology has been disclosed by U.S. Pat. No. 9,680,548 B1. Accordingly, it would not to introduce how to carry out an intelligent fast antenna steering technology (iFAST) again in the present invention. For instance, how to calculate a best wireless network weight based on wireless network parameters of wireless signals received from wireless stations 4 would not be repeatedly described in the present invention. In the present invention, the said intelligent fast antenna steering technology is edited to an iFAST library and then embedded into the memory module by a form of the iFAST unit 111. By such arrangement, the iFAST unit 111 is able to activate the MAC module 12 and the baseband processor 13 to control the intelligent antenna module 2 achieve a comprehensively-directional antenna scan through the API unit 113 and the WiFi driver unit 112. There are some important parameters are particularly defined in the execution program of the iFAST unit 111. The parameters are listed in following Table (1).

TABLE 1

| Parameters | Descriptions |
| --- | --- |
| bigT | Frequency for achieving one comprehensively-directional antenna scan |
| smallT | A certain period of time |
| expirationT | Expiration time of a controlling bit set generated by the iFAST unit 111. |
| iFAST_enable | Variable or control bit for controlling the enabling and the disabling of the iFAST unit 111 during the operation of the WiFi driver unit 112. 1: enable 0: disable |

After at least one wireless station 4 is established connections with the wireless network transceiving device 3, the iFAST unit 111 would calculates a corresponding best wireless network weight based on wireless network parameters of at least one wireless signal received by the intelligent antenna module 2 from the wireless station 4. Therefore, the iFAST unit 111 creates at least one wireless station entry records in at least one MAC station entry table of the MAC module 12, wherein the wireless station entry records comprises the said best wireless network weight and wireless network parameters relative to the best wireless network weight. It is understood that different wireless station entry records are corresponding to various wireless stations. Therefore, the number of the wireless station entry records is dependent on that of the wireless stations established connections with the wireless network transceiving device 3. Herein, the said wireless station means a laptop computer, a desktop computer, a tablet PC, a smart phone, a smart watch, and any one electronic with WiFi capability.

Furthermore, after accessing the updated wireless station entry records in at least one MAC station entry table contained by the MAC module 12, the baseband processor 13 is facilitated to change settings of the intelligent antenna module 2 by outputting a control signal to the control electrodes 23, and the transceiver module 14 converts a baseband signal generated by the baseband processor 13 to an RF signal. Subsequently, the intelligent antenna module 2 radiates at least one wireless network signal to targetedly cover the wireless stations 4 after receiving the RF signal through the signal inputting electrodes 23. For instance, the baseband processor 13 immediately varies the settings of the intelligent antenna module 2 based on an updated wireless station entry records in the MAC station entry table contained by the MAC module 12 while transmitting wireless network signal to the laptop computer shown in FIG. 5, such that the radiated wireless network signal is ensured to well cover the laptop computer. As a result, user of the laptop computer enjoys an available wireless network service under a good quality of service (QoS). Of course, when transmitting wireless network signal to the smart phone shown in FIG. 5, the wireless network transceiving device 3 would also instantaneously change the settings of the intelligent antenna module 2 based on corresponding wireless station entry records in the MAC station entry table contained by the MAC module 12.

Figure 6A:
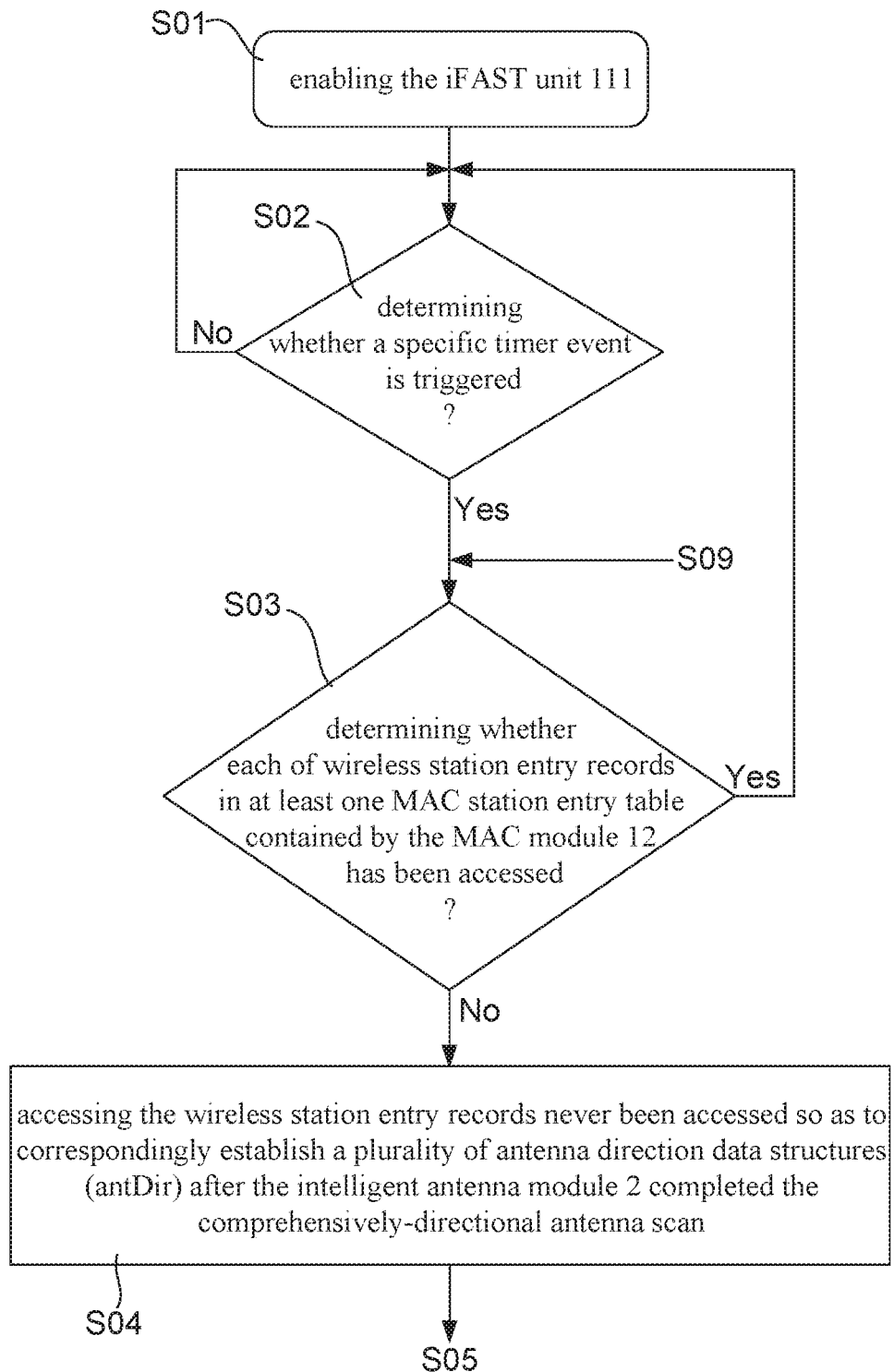
FIG. 6A, FIG. 6B and FIG. 6C show a flowchart diagram of a method for carrying out an intelligent fast antenna steering technology (iFAST) according to the present invention.
Figure 6B:
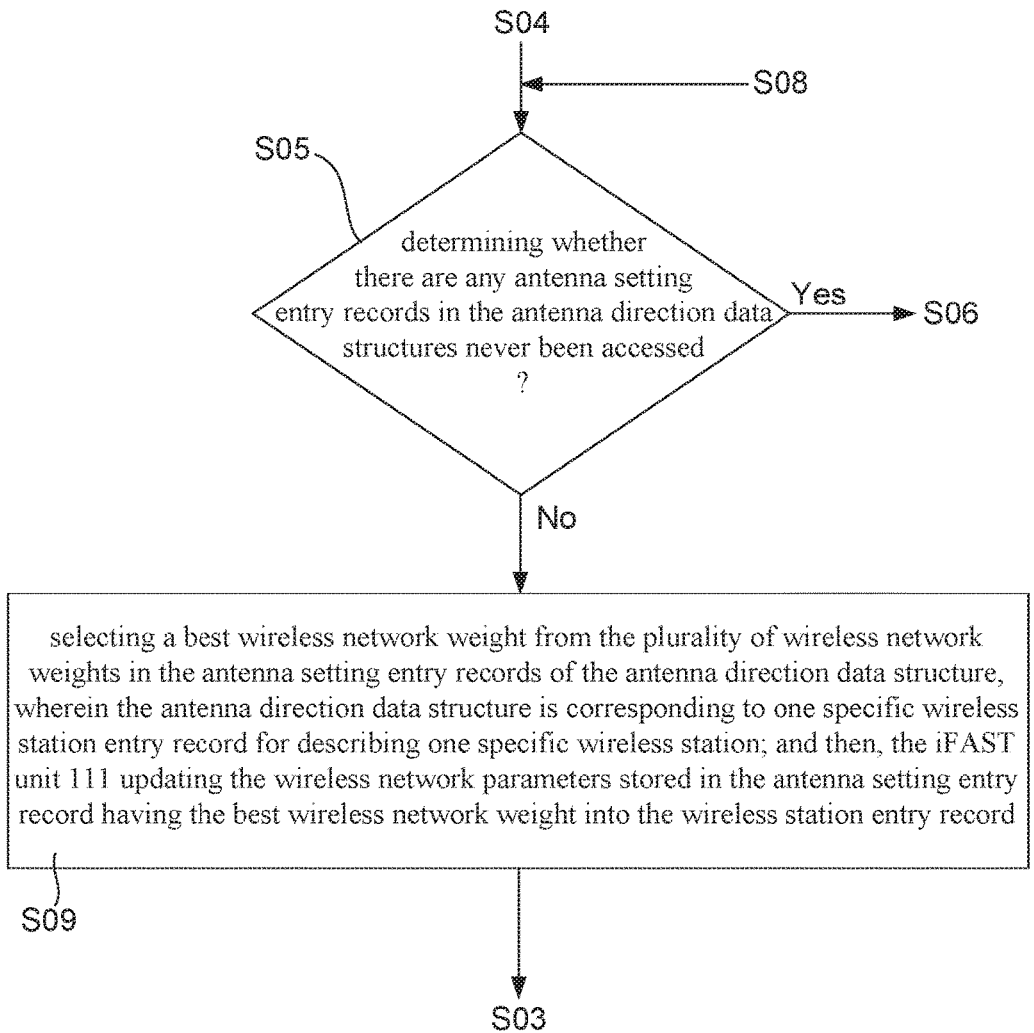
Figure 6C:
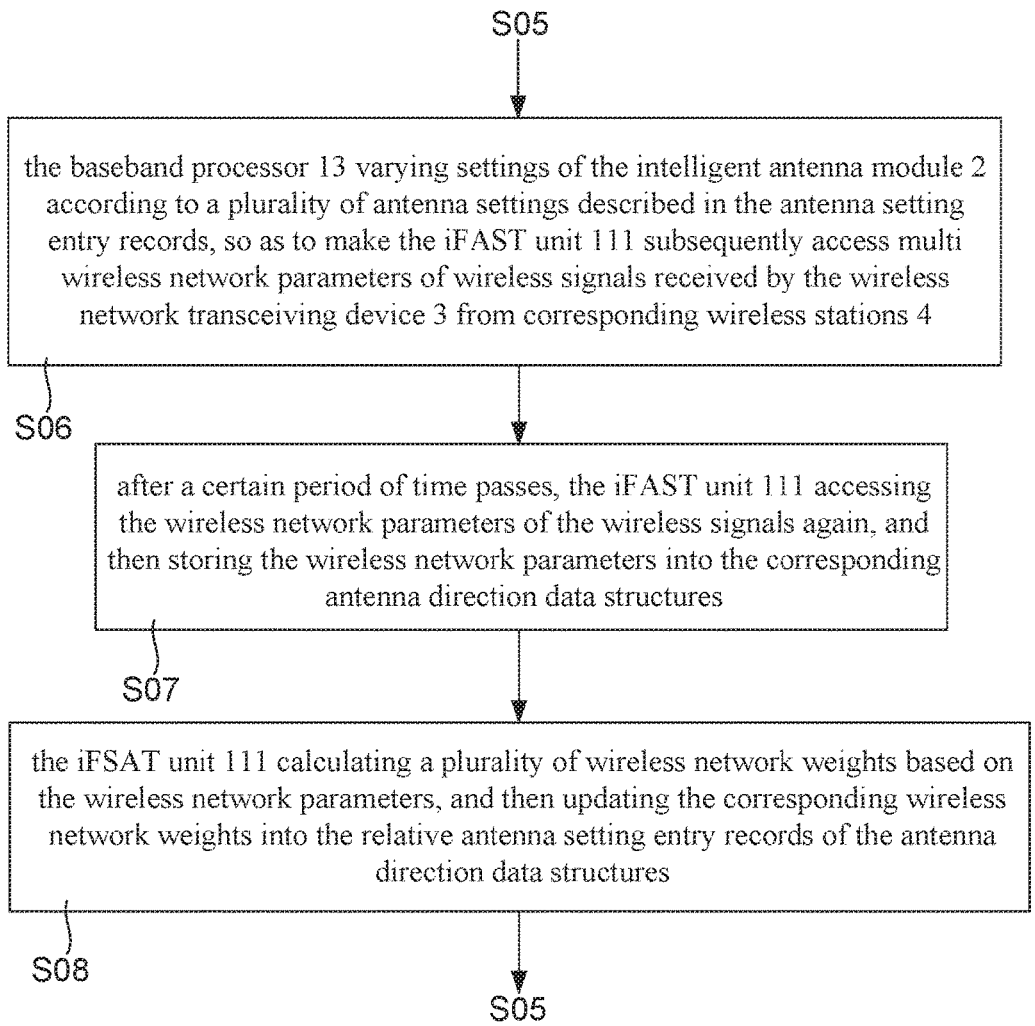

As FIG. 4 shows, the electronic device 1 further comprises one logic control unit 16 electrically connected between the baseband processor 13 and the control electrodes of the intelligent antenna module 2, which is used for converting the control signal to a voltage signal such as a high-level voltage signal, a low-level voltage signal, or a complex voltage signal combined by the high-level voltage signal and the low-level voltage signal. In addition, the present invention simultaneously discloses a method for carrying out an intelligent fast antenna steering technology (iFAST). FIG. 6A, FIG. 6B and FIG. 6C illustrate a flowchart diagram of the method for carrying out an intelligent fast antenna steering technology (iFAST) according to the present invention. With references to FIG. 4, FIG. 5 and FIG. 6A, the method flow firstly proceeds to step S01 so as to enable the iFAST unit 111 provided in the memory module 11 of the electronic device 1. In practical operations, it is able to activate the iFAST unit 111 by booting the wireless network transceiving device 3. After the wireless network transceiving device 3 is booted, library of an intelligent fast antenna steering technology (i.e., the iFAST unit 111) is immediately implemented into the WiFi driver unit 112 through the API unit 113. Next, the method flow proceeds to step S02 for determining whether a specific timer event is triggered for driving the intelligent antenna module 2 to start a comprehensively-directional antenna scan. In normal case, the intelligent antenna module 2 must be controlled to complete one time of comprehensively-directional antenna scan for checking is there any wireless station 4 established connection with the wireless network transceiving device 3, such that the iFAST unit 111 is facilitated to verify whether the wireless station 4 established connection with the wireless network transceiving device 3 is well covered by the wireless network signal radiated through the intelligent antenna module 2.

In step S03 of the method, it is determined whether each of wireless station entry records in at least one MAC station entry table contained by the MAC module 12 has been accessed. If there is one wireless station entry record never been accessed, it means there is a wireless station 4 firstly has a wireless connection with the wireless network transceiving device 3. Meanwhile, the method flow subsequently proceeds to step S04 for accessing the wireless station entry records never been accessed so as to correspondingly establish a plurality of antenna direction data structures (antDir) after the intelligent antenna module 2 completed the comprehensively-directional antenna scan. The plurality of antenna direction data structures are antDir 1, antDir 2, antDir N and so forth.

Furthermore, in step S05, it is determining whether there are any antenna setting entry records in the antenna direction data structures never been accessed. It needs to explain that "the antenna setting entry record been accessed" means the antenna setting entry record is updated by iFAST unit 111 and has been verified to be valid. It is worth noting that, the way to determine whether the antenna setting entry record is valid is disclosed in U.S. Pat. No. 9,680,548 B1. According to the particularly design of the present invention, when there is one antenna setting entry record in the antenna direction data structures does still not be accessed, the method flow would proceed to step S06.

During the execution of the step S06, the baseband processor 13 is facilitated to vary settings of the intelligent antenna module 2 according to a plurality of antenna settings described in the antenna setting entry records, so as to make the iFAST unit 111 subsequently access multi wireless network parameters of wireless signals received by the wireless network transceiving device 3 from corresponding wireless stations 4. Next, the method flow continuously proceeds to step S07. In the step S07, the iFAST unit 111 accesses the wireless network parameters of the wireless signals again after a certain period of time passes, and then the wireless network parameters are stored into the corresponding antenna direction data structures. Subsequently, the method proceeds to step S08 for calculating a plurality of wireless network weights based on the wireless network parameters through the iFSAT unit 111. Therefore, the iFSAT unit 111 updates the corresponding wireless network weights into the relative antenna setting entry records of the antenna direction data structures.

Briefly speaking, when there are three wireless stations 4 have connections with the wireless network transceiving device 3, the iFAST unit 111 applied in the electronic device 1 would correspondingly produce three antenna direction data structures by the execution of the steps S06-S08. Moreover, after all of the antenna setting entry records of the antenna direction data structures have been accessed, the method flow goes back to the step S05 for repeatedly inspecting whether there are any antenna setting entry records in the antenna direction data structures never been accessed. Therefore, if there is no antenna setting entry records in the antenna direction data structures never been accessed, the method flow would next proceed to step S09 for selecting a best wireless network weight from the plurality of wireless network weights in the antenna setting entry records of the antenna direction data structure. Above descriptions have stated that each of the antenna direction data structures has its corresponding wireless station 4. In the present invention, step S09 is arranged for selecting a best wireless network weight from multi antenna setting entry records in a specific antenna direction data structure for describing one specific wireless station. After the said best wireless network weight is selected, the iFAST unit 111 subsequently updated the wireless network parameters stored in the antenna setting entry record having the best wireless network weight into the wireless station entry record.

After the step S09 is finished, the method flow goes back to the step S03. In other words, the iFAST unit 111 is configured to continuously verify whether each of wireless station entry records in at least one MAC station entry table contained by the MAC module 12 has been accessed, in order to ensure all the wireless stations 4 having connections with the wireless network transceiving device 3 capable of being well covered by the wireless network signals radiated through the intelligent antenna module 2.

It needs to further explain that, the iFAST unit 111 updates the wireless network parameters stored in the antenna setting entry record having the best wireless network weight into the wireless station entry record by embedding a controlling bit set into a TX descriptor of the MAC station entry table contained by the MAC module 12. With reference to following Table (2), for example, the controlling bit set comprises: bits for controlling the comprehensively-directional antenna scan, bits for controlling the establishment of the antenna direction data structures (antDir), and bits for controlling the enabling and the disabling of the iFAST unit 111 during the operation of the WiFi driver unit 112.

TABLE 2

| Bit address | Bit notation | Description |
| --- | --- | --- |
| 31:30 | antDir_RFport1 | Bits for controlling the settings of the |
| 29:28 | antDir_RFport2 | plurality of antenna units 21 of the |
| 27:26 | antDir_RFport3 | intelligent antenna module 2. |

TABLE 2-continued

| Bit address | Bit notation | Description |
|---|---|---|
| 25:24 | antDir_RFport4 | 00: antDir1 01: antDir2 10: antDir3 11: antDir4 |
| 23 | ifast2_VALID | Bits for verifying whether the connection between the API unit 113 and the WiFi driver unit 112 is valid. 1: valid 0: invalid |

From Table (1) and Table (2), it is understood that, bit for enabling the iFAST unit 111 (i.e., "iFAST_enable") is set to "1", and then the MAC module 12 transmits a TX descriptor to the baseband processor 13, so as to facilitated the baseband processor 13 generate a control signal to the control electrodes 23 of the intelligent antenna module 2. Therefore, the intelligent antenna module 2 is properly adjusted, and then radiates the wireless network signal to targetedly cover the wireless stations 4 having connections with the wireless network transceiving device 3. As a result, all of the users of the wireless stations 4 have an available wireless network service under a good quality of service (QoS). On the contrary, bit for disabling the iFAST unit 111 (i.e., "iFAST_enable") is set to "0" before the step S06 is executed for make wireless network transceiving device 3 receive wireless signals from the wireless stations 4. That is, the intelligent antenna module 2 is configured to receive the wireless signals of the wireless stations 4 omni-directionally.

Therefore, through above descriptions, the electronic device for controlling an intelligent antenna module and the method for carrying out an intelligent fast antenna steering technology (iFAST) have been introduced completely and clearly; in summary, the present invention includes the advantages of:

(1) The present invention provides an electronic device 1 for controlling an intelligent antenna module and a method for carrying out an intelligent fast antenna steering technology (iFAST), wherein the electronic device 1 mainly comprises: a memory module 11, a media access controlling (MAC) module 12, and a baseband processor 13. In the present invention, the memory module 12 is provided with an intelligent fast antenna steering (iFAST) unit 111, a WiFi driver unit 112, and an application interface (API) unit. Particularly, according to the wireless network parameters of wireless signals received by an intelligent antenna module 2 disposed on a wireless network transceiving device 3 from wireless stations 4, the iFAST unit 111 would immediately update relative MAC station entry tables contained by the MAC module 12. Therefore, the baseband module 13 is able to correspondingly adjust the settings of the intelligent antenna module 2 of the wireless network transceiving device 3 based on relative wireless station entry records been established in the MAC station entry tables of the MAC module 12. As a result, the wireless network transceiving device 3 is ensured to radiate wireless network signals for targetedly covering the wireless stations 4.

The above description is made on embodiments of the present invention. However, the embodiments are not intended to limit scope of the present invention, and all equivalent implementations or alterations within the spirit of the present invention still fall within the scope of the present invention.

What is claimed is:

1. A method for carrying out an intelligent fast antenna steering technology (iFAST) in a wireless network transceiving device, being implemented into the wireless network transceiving device by a form of an electronic chip comprising a memory module, a media access controlling (MAC) module, a baseband processor, and at least one transceiver module; moreover, the wireless network transceiving device having an intelligent antenna module comprising a plurality of antenna units, a plurality of signal inputting electrodes and a plurality of control electrodes; wherein the method comprising following steps:

(1) providing an intelligent fast antenna steering (iFAST) unit, an application interface (API) unit, and a WiFi driver unit in the memory module, and enabling the iFAST unit;

(2) determining whether a specific timer event is triggered for driving the intelligent antenna module to start a comprehensively-directional antenna scan; if yes, proceeding to step (3); otherwise, proceeding back to the step (2);

(3) determining whether each of wireless station entry records in at least one MAC station entry table contained by the MAC module has been accessed; if yes, proceeding to step (4); otherwise, proceeding back to the step (2);

(4) accessing the wireless station entry records that have never been accessed so as to correspondingly establish a plurality of antenna direction data structures (antDir) after the intelligent antenna module completed the comprehensively-directional antenna scan;

(5) determining whether there are any antenna setting entry records in the antenna direction data structures that have never been accessed; if yes, proceeding to step (6); otherwise, proceeding to step (9);

(6) the baseband processor varying settings of the intelligent antenna module according to a plurality of antenna settings described in the antenna setting entry records, so as to make the iFAST unit subsequently access multi wireless network parameters of wireless signals received by the wireless network transceiving device from corresponding wireless stations;

(7) after a certain period of time passes, the iFAST unit accessing the wireless network parameters of the wireless signals again, and then storing the wireless network parameters into the corresponding antenna direction data structures;

(8) the iFSAT unit calculating a plurality of wireless network weights based on the wireless network parameters, and then updating the corresponding wireless network weights into the relative antenna setting entry records of the antenna direction data structures; subsequently, proceeding back to the step (5); and (9) selecting a best wireless network weight from the plurality of wireless network weights in the antenna setting entry records of the antenna direction data structure, wherein the antenna direction data structure is corresponding to one specific wireless station entry record for describing one specific wireless station; and then, the iFAST unit updating the wireless network parameters stored in the antenna setting entry record having the best wireless network weight into the wireless station entry record; subsequently, proceeding back to the step (3).

2. The method of claim 1, wherein the wireless network transceiving device is selected from the group consisting of: wireless network access point (AP), wireless network router, wireless network repeater, and wireless network card; moreover, the wireless station being selected from the group consisting of laptop computer, desktop computer, tablet PC, smart phone, smart watch, and electronic with WiFi capability.

3. The method of claim 1, wherein the iFAST unit updates the wireless network parameters stored in the antenna setting entry record having the best wireless network weight into the wireless station entry record by embedding a controlling bit set into a TX descriptor of the MAC station entry table.

4. The method of claim 3, wherein the controlling bit set comprises:
   bits for controlling the comprehensively-directional antenna scan;
   bits for controlling the establishment of the antenna direction data structures; and
   bits for controlling the enabling and the disabling of the iFAST unit during the operation of the WiFi driver unit.

* * * * *